(12) United States Patent
Andeweg

(10) Patent No.: US 11,577,833 B2
(45) Date of Patent: Feb. 14, 2023

(54) UNMANNED AERIAL VEHICLE FOR POSITIONING AGAINST A WALL

(71) Applicant: TERRA INSPECTIONEERING B.V., Bruinisse (NL)

(72) Inventor: Sem Andeweg, Oostburg (NL)

(73) Assignee: TERRA INSPECTIONEERING B.V., Bruinisse (NL)

( * ) Notice: Subject to any disclaimer, the term of this patent is extended or adjusted under 35 U.S.C. 154(b) by 417 days.

(21) Appl. No.: 16/644,983

(22) PCT Filed: Sep. 6, 2018

(86) PCT No.: PCT/NL2018/050575
§ 371 (c)(1),
(2) Date: Mar. 6, 2020

(87) PCT Pub. No.: WO2019/050401
PCT Pub. Date: Mar. 14, 2019

(65) Prior Publication Data
US 2020/0283144 A1    Sep. 10, 2020

(30) Foreign Application Priority Data

Sep. 11, 2017   (NL) ...................................... 2019523

(51) Int. Cl.
*B64C 39/02* (2006.01)
*B64C 25/34* (2006.01)

(52) U.S. Cl.
CPC ............ *B64C 39/024* (2013.01); *B64C 25/34* (2013.01); *B64C 2201/027* (2013.01); *B64C 2201/108* (2013.01)

(58) Field of Classification Search
CPC ... B64C 25/32; B64C 25/34; B64C 2201/108; B64C 2201/027
See application file for complete search history.

(56) References Cited

U.S. PATENT DOCUMENTS 8,874,283 B1 * 10/2014 Cavote .................. B64C 39/024
701/28
9,522,732 B1 * 12/2016 Froloff .................. B64C 39/024
(Continued)

FOREIGN PATENT DOCUMENTS

CN    105799921 A    7/2016
CN    106005408 A    10/2016
(Continued)

OTHER PUBLICATIONS

International Search Report and Written Opinion, dated Jan. 7, 2019, from corresponding/related International Application No. PCT/NL2018/050575.
(Continued)

*Primary Examiner* — Tye William Abell
(74) *Attorney, Agent, or Firm* — Nixon & Vanderhye

(57) ABSTRACT

Disclosed is an unmanned aerial vehicle adapted to be positioned against a substantially vertical wall while hovering in the air, including a body and rotors, an arm end, a first leg end and a second leg end intersected by a front plane and adapted for together contacting the wall at three spaced apart positions, the front plane intersecting a vertical axis of the UAV at an upper side of a first plane spanned by a lateral and longitudinal axis of the UAV, the front plane extending at a first angle of between 45 to 85 degrees to the first plane; wherein the UAV is adapted for tilting upon contact of the first and second leg ends with the wall while the arm end approaches the wall, about the first and second leg ends and towards the wall, until the arm end contacts the wall.

18 Claims, 5 Drawing Sheets

(56) References Cited

U.S. PATENT DOCUMENTS

| | | | |
|---|---|---|---|
| 2011/0204188 A1* | 8/2011 | Marcus | B64C 29/0058 |
| | | | 244/23 B |
| 2016/0236772 A1 | 8/2016 | Tang | |
| 2016/0236777 A1 | 8/2016 | Tang | |

FOREIGN PATENT DOCUMENTS

| | | |
|---|---|---|
| CN | 106364673 A | 2/2017 |
| DE | 10 2014 001 702 A1 | 8/2015 |
| DE | 10 2014 211 721 A1 | 12/2015 |
| DE | 10 2015 110 466 A1 | 1/2017 |
| EP | 3 031 538 A1 | 6/2016 |
| FR | 3 036 381 A1 | 11/2016 |
| GB | 2483881 A | 3/2012 |
| WO | 2012/013878 A1 | 2/2012 |
| WO | 2015/150529 A1 | 10/2015 |
| WO | 2015/162613 A1 | 10/2015 |

OTHER PUBLICATIONS

Flyability SA, "Product Notice", Elios, the collision-tolerant inspection UAV, pp. 1-7, website: info@flyability.com.

* cited by examiner

UNMANNED AERIAL VEHICLE FOR POSITIONING AGAINST A WALL

TECHNICAL FIELD

The invention relates to an unmanned aerial vehicle (UAV) adapted to be positioned against a substantially vertical wall, and to a method for positioning a UAV against a substantially vertical wall while the UAV is hovering.

BACKGROUND ART

WO 2015/162613 shows a wall-drawing hovering device comprising an unmanned helicopter with a drawing system for drawing on a vertical surface.

WO 2012/013878 describes a UAV comprising a measurement probe for measuring a wall thickness upon contact of the probe with a vertical wall during hovering of the UAV. The known device is particularly suitable to be used in hard to reach locations. However, during hovering of the UAV, contact between the UAV and the wall may become unstable, reducing the accuracy of measurements carried out with the probe.

It is an object of the present invention to provide a UAV adapted for providing a more stable contact between a substantially vertical wall and a UAV during hovering of the UAV. It is a further object of the invention to provide a method for stably positioning a UAV against a substantially vertical wall.

It is a further object of the invention to provide a UAV suitable for use in dangerous environments, such as indoor environments where explosive or corrosive materials are stored, and which may be controlled remotely from said environment.

SUMMARY OF THE INVENTION

According to an aspect of the invention, there is provided an unmanned aerial vehicle, UAV, adapted to be positioned against a substantially vertical wall while hovering in the air, the vehicle defining a longitudinal axis, a lateral axis and a vertical axis, the longitudinal axis and the lateral axis together spanning a first plane having an upper side and an oppositely facing lower side, the vehicle comprising: a body and a number of rotors supported by said body, the rotors being adapted for together exerting a propulsion force on the vehicle in an upward substantially vertical direction; an arm attached to the body and comprising an arm end arranged at a distal end of the arm away from the body; one or more legs rotation fixedly attached to the body and comprising a first leg end and a second leg end, wherein the leg ends are arranged at distal ends of the one or more legs away from the body and below the arm end when the rotors exert the propulsion force on the vehicle in the upward substantially vertical direction; wherein the arm end, the first leg end and the second leg end are intersected by a front plane and are adapted for together contacting the wall at three spaced apart positions, said front plane intersecting the vertical axis at the upper side of the first plane and extending at a first angle of between 45 to 85 degrees to the first plane; and wherein the body, the rotors, the arm end and leg ends are adapted for tilting in conjunction, upon contact of the first and second leg ends with the vertical wall while the first and second leg ends are arranged along a substantially horizontal line and while the arm end approaches the wall, about the first and second leg ends and towards the wall, until the arm end contacts the substantially vertical wall.

When the UAV hovers freely in the air, i.e. without contacting the wall, it is moveable to roll around its longitudinal axis, pitch around its lateral axis and yaw around its vertical axis. The vehicle's longitudinal axis, lateral axis and vertical axis are orthogonal to each other and all intersect the UAV's center of mass.

Preferably the UAV is provided with a wireless transmitter/receiver, for receiving control signals, and for transmitting signals, e.g. measurement signals, from and to an operator. The UAV can thus be used in a closed space while the operator remains at a safe distance from the space.

During use, the UAV is typically operated initially to hover towards the vertical wall, with both leg ends facing towards the wall, preferably with all axes of the rotors extending substantially vertically. Once both leg ends contact the wall, the leg ends, body, arm end and rotors of the UAV will tilt towards the wall until the arm end also contacts the wall. When the leg ends and the arm end contact the wall, the UAV contacts the wall at at least three points, with the rotors being tilted, together with the body, arm ends and legs ends, towards the wall. The propulsion force exerted by the rotors on the UAV tilted in this manner comprises a horizontal component which pushes the UAV towards the wall, providing a stable positioning of the UAV against the wall.

When the leg ends contact the wall and while the arm end is space apart from the wall, the UAV may be tilted about the leg ends in such a manner that the body, arm end, leg end and rotor axes are rotated along a vertical plane that is normal to the wall, substantially without rotating along a plane parallel to the wall and substantially without rotating in a horizontal plane. As a result, during and after tilting, the propulsion force exerted by the rotors will push the UAV against the wall, substantially without causing a change in position of the first and second leg end against the wall, thus allowing accurate positioning of the UAV. In the tilted orientation of the UAV, the rotors exert a nonzero horizontal propulsion force on the UAV towards the wall. A tilting angle between the UAV in a hovering position in which its vertical axis is substantially vertical and the UAV in a position in which its leg ends and arm end(s) contact the vertical wall, is defined as 90 degrees minus the first angle. Thus, between a minimum tilting angle of 5 degrees and a maximum tiling angle of 45 degrees, and when the arm end(s) and leg ends contact the wall, a significant component of the propulsion force pushes the UAV against the wall, while the remaining portion of the propulsion force ensures that the UAV remains hovering. The minimum tilt angle of 5 degrees has been found to result in sufficient portion of the propulsion force being towards the wall to keep the UAV pressed a stable manner against the wall. The maximum tilt angle of 45 degrees was found to result in the propulsion force pushing the UAV against the wall, without causing the UAV to tilt about its arm end. The propulsion force of the rotors preferably causes the arm end to exert a force onto the wall with a magnitude of at least 8% of the propulsion force, more preferably about $\cos(\alpha)$ times the propulsion force. All leg ends preferably lie on a common straight line.

As the one or more legs are rotation fixedly attached to body, tilt of the body will result in a corresponding tilt of the one or more legs. Preferably the one or more legs as well as the arm is rotation fixedly attached to the body in a manner that the position and orientation of front plane relative to the body is substantially fixed.

Preferably the UAV defines a maximum distance between two rotor axes of between 30 and 100 centimetres. More preferably the UAV fits through an opening with a diameter of 24", i.e. 61 cm, irrespective of the depth of the opening.

Preferably the UAV has a weight of between 500 grams and 5 kilograms, so that it can be carried by a single person.

In an embodiment the leg ends and one or more of the arm ends form vertices of a bounding convex polygon of all the arm ends and all the leg ends in the front plane. The bounding convex polygon is preferably an acute triangle in case the UAV only has a single arm end. If the UAV comprises two or more arm ends, the convex polygon preferably is an acute trapezoid. In the latter case the trapezoid typically comprises a longer base edge between those of the leg ends which form vertices of the bounding convex polygon which are spaced furthest apart from each other, and a shorter base edge, parallel to the longest base edge, between those of the arm ends which form vertices of the bounding convex polygon and are spaced further apart from each other.

Preferably, the bounding convex polygon is symmetrical with respect to a line in the front plane which is normal to the substantially horizontal line between the two leg ends.

When viewed on projection onto the front plane, a maximum distance between the leg ends which form vertices of the bounding convex polygon is preferably at least 8 times a maximum distance between arm ends which form vertices of the bounding convex polygon.

In an embodiment, the UAV comprises only a single leg. In this case, the first and second leg ends are formed by the two distal ends of the same leg. The two leg ends may be formed as opposite ends of a substantially cylindrical part of the single leg, the leg further comprising a middle portion connecting the substantially cylindrical part to the body of the UAV.

In an embodiment the leg ends define a mutual distance of at least 10% of the maximum distance between two rotor axes, such that the yaw of the UAV is substantially stabilized when tilting around the leg ends.

In an embodiment the legs are connected to the body at a distance from the front plane which is at least the diameter of the rotor that is located closest to the first plane.

Preferably the UAV is a tricopter, quadcopter, hexacopter, octocopter or a V-shaped UAV.

In an embodiment, the leg ends intersect a second plane normal to the first plane, and when viewed in projection onto the second plane, the rotors are arranged between a first line through the leg ends and a second line through the arm end and parallel to the first line, wherein the rotors are spaced apart from both lines respectively by a distance equal to or greater than one fourth of the distance between the first and second line. As the rotors are provided below the arm end and above the leg ends, tilting around the leg ends may be conveniently realized. Preferably, not only the centres of the rotors but also the area defined by the rotation of the rotor blades are arranged between the two lines.

In an embodiment, the leg ends are arranged for allowing axes of the rotors to remain in substantially parallel vertical planes during said tilting when the leg ends are in contact with the wall and arranged on the substantially horizontal line.

In an embodiment, the unmanned aerial vehicle further comprises an inspection or manipulation device attached to the arm, wherein the inspection or manipulation device is adapted for measuring a wall property and/or for manipulating the wall. The inspection or manipulation device may be adapted for sensing, inspecting, actuating or manipulating a wall property. The wall property may include wall thickness, temperature, topography, colour, visual irregularities, wall composition and also properties of the direct proximity of the wall such as temperature, air composition, etc. The inspection device may include ultrasonic sensor, Eddy Current sensor, infrared sensor, NVDI (Normalised Vegetation Difference Index) sensor, spectrometer, magnetometer, Geiger teller, LEL (Lower Explosion Limit) sensor and/or gas sensor. The manipulation device may include a scrapping tool, drilling tool, brushing tool, glue application tool, and/or an object placement tool. The manipulation device may, alternatively or in addition, include an (ultrasonic) sensor for measuring a thickness of a coating on the wall.

In an embodiment, said inspection or manipulation device is adapted for inspecting or manipulation of the wall while making pressure contact with the wall. This may comprise measuring the wall thickness or any application for which stable pressure contact with the wall is required. Pressure contact refers in this context to the fact that due to the tilting of the UAV a pressure is exerted by the inspection or manipulation device on the wall in a substantially horizontal direction. Preferably, the UAV is adapted for having the inspection or manipulation device exert a force on the wall of between 0.5 and 10 N, more preferably between 1 and 5 N, for a time period of at least 5 seconds.

In an embodiment, the inspection or manipulation device is rotatably attached to the arm, preferably resiliently attached to the arm. The inspection or manipulation device may comprise a rotatable or resilient tripod connected to the arm, adapted for self-aligning so that the three tripod legs all contact with the wall when the UAV has tilted against the wall. This allows the inspection or manipulation device to contact the wall in a predetermined orientation with respect to the vertical wall. The inspection or manipulation device may be a sensor surrounded by three legs of a tripod which are adapted to contact the wall. Alternatively, the inspection or manipulation device may be a sensor connected to one of the legs of a tripod which is adapted to stably contact the wall.

In an embodiment, the arm end is formed by the inspection or manipulation device, wherein the inspection or manipulation device is arranged for contacting the wall upon tilt of the vehicle. During tilting, the arm end is pressed against the wall due to the propulsion force exerted on the UAV by the rotors. As the inspection or manipulation device forms the arm end, a pressing contact is established.

In an embodiment, the inspection or manipulation device has an contact end for contacting the wall, wherein said contact end, at least when the vehicle is in the tilted position in which the arm end and first and second leg ends contact the wall, is arranged partially in the front plane. When the contact end is in the front plane, it contacts the wall when the arm end and leg ends contact the wall too. In this way, a measurement or manipulation for which contacting the wall is required can be executed. The contact end may project through the frontal plane when the UAV is not in contact with the wall.

In an embodiment, the rotor axes extend substantially parallel to each other and intersect a first plane that is normal to the rotor axes. Thus, the orientation of the rotor axis may be fixed with respect to the body, resulting in a UAV of a particularly simple construction.

In an embodiment, when viewed in projection onto the first plane, at least one of the rotor axes is arranged between a first line through the leg ends and a third line through a point where the arm is connected to the body and parallel to the first line.

When the rotor axis that is closest to the front plane is located closer to the wall than the connection between the arm and the body, particularly effective pressure contact between the arm end and the wall can be realized. Preferably the arm is substantially straight and defines an angle with the first plane, facing the front plane, of between 10 and 60 degrees. Preferably, the area defined by the rotation of the rotor connected to the rotor axis is entirely arranged between the first line and the third line.

In an embodiment, the rotors are arranged between a bottom plane parallel to the first plane and intersecting the leg ends and a top plane parallel to the first plane and intersecting the arm end, wherein the rotors are spaced apart from both the top plane and the bottom plane respectively by a distance equal to or greater than one fourth of the distance between the top plane and the bottom plane. In this manner, a minimum distance between the first plane and the top plane is defined which promotes convenient tilting of the UAV around the line through the leg ends.

In an embodiment, when viewed in projection onto the first plane, the arm end is spaced apart by an arm distance from the second plane, the arm distance being greater than 5% of the maximum distance between two rotor axes, preferably greater than 10% of the maximum distance between two rotor axes, more preferably greater than 15% of the maximum distance between any two rotor axes of the UAV. Such a distance from the second plane to the arm end facilitates tilting of the UAV upon contact between the leg ends and the wall.

In an embodiment, the rotors are arranged substantially symmetrically around a symmetry axis which extends parallel to the vertical axis. The symmetrical arrangement of the rotors provides a UAV which can be easily manoeuvred. The symmetry axis is preferably coincides with the vertical axis, or is spaced at a distance from the vertical axis less than 10% of a maximum distance between any two rotor axes of the UAV, preferably smaller than 5% of the maximum distance between any two rotor axes of the UAV.

In an embodiment, the vehicle has a centre of mass, and when viewed in projection onto the first plane, the arm is attached to the body at a location at or rearward of a line through the centre of mass and parallel to a first line through the leg ends.

Attachment of the arm to the body rearward of a line means in this context that the arm is attached to the body at a greater distance with respect to the front plane than the distance between the line and the front plane. By placing the attachment of the arm at a position beyond the centre of mass a stable tripod may be formed by the arm and the two legs, while simultaneously the stability of the UAV when flying is promoted.

In an embodiment the arm end and/or the leg ends comprise rotatable wheels for contacting the wall. This allows the UAV to travel along the vertical wall while in the titled position in which it is pressed against the wall. Thus, the UAV can be moved along the wall with the wheels contacting the wall, while the inspection or manipulation device remains at a constant distance from the wall. Preferably the wheel axes extend horizontally when the UAV is tilted against the wall. This allows rolling movement of the UAV across the wall in the vertical direction only.

In an embodiment, the vehicle further comprises one or more upper legs rotation fixedly attached to the body and comprising a third leg end and a fourth leg end, wherein the third and fourth leg end are arranged at distal ends of the one or more upper legs away from the body at the upper side of the first plane, and wherein the third and fourth leg end define a horizontal line parallel to the first plane, and wherein the third and fourth leg end extend further from the first plane than the arm end. The upper legs and the arm allow the same UAV to be positioned in a stable manner against a substantially horizontal ceiling. The UAV may hover upwards and, upon contact of the third and fourth leg ends with the ceiling, tilt towards the ceiling until the arm end touches the ceiling. In this way the UAV is stably positioned against the ceiling. Alternatively, a second arm may be provided, which takes on the role of the arm in the process of positioning against the ceiling.

In a further aspect of the invention, there is provided a method for positioning an unmanned aerial vehicle, preferably a UAV as described herein, against a substantially vertical wall, the vehicle defining a longitudinal axis, a lateral axis and a vertical axis, the longitudinal axis and the lateral axis together spanning a first plane having an upper side and an oppositely facing lower side, the vehicle further comprising two leg ends and an arm end, wherein a front plane intersects the two leg ends and the arm end, said front plane intersecting the vertical axis at the upper side of the first plane and extending at a first angle of between 45 to 85 degrees to the first plane; the method comprising:

manoeuvring the vehicle to the wall until the two leg ends contact the wall, and tilting the vehicle about the two leg ends which contact the wall, towards the wall until the arm end touches the wall.

BRIEF DESCRIPTION OF DRAWINGS

Embodiments will now be described, by way of example only, with reference to the accompanying schematic drawings in which corresponding reference symbols indicate corresponding parts.

The figures are meant for illustrative purposes only, and do not serve as restriction of the scope or the protection as laid down by the claims.

DESCRIPTION OF EMBODIMENTS

Figure 1A:
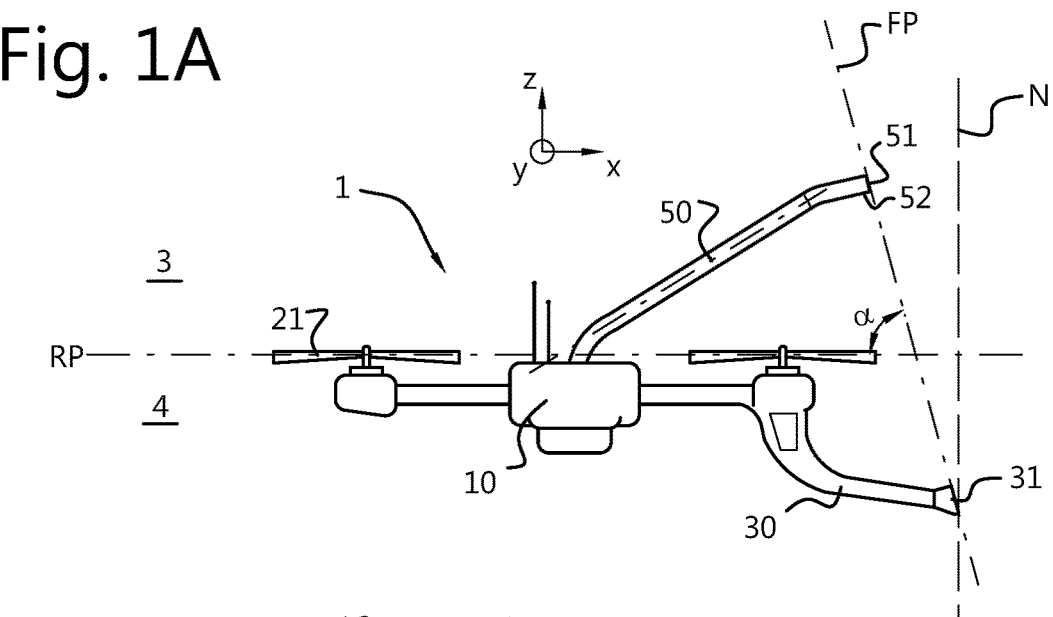
FIGS. 1A-1C schematically show a side view, front view, and top view of a UAV according to the invention, respectively.
Figure 1B:
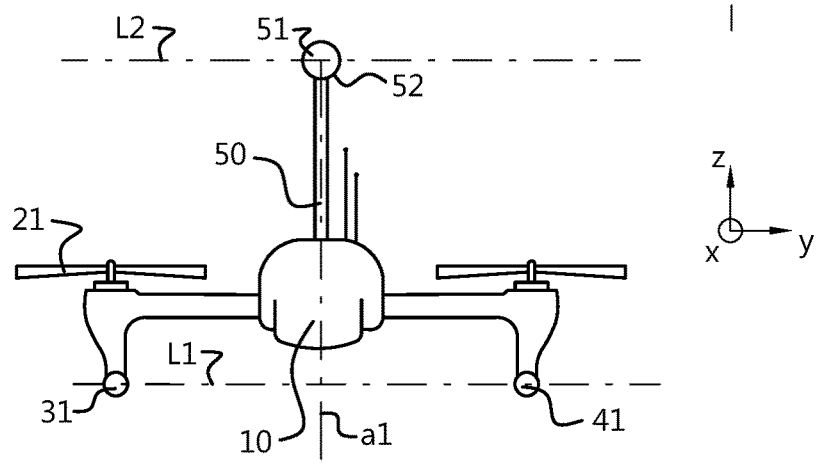
Figure 1C:
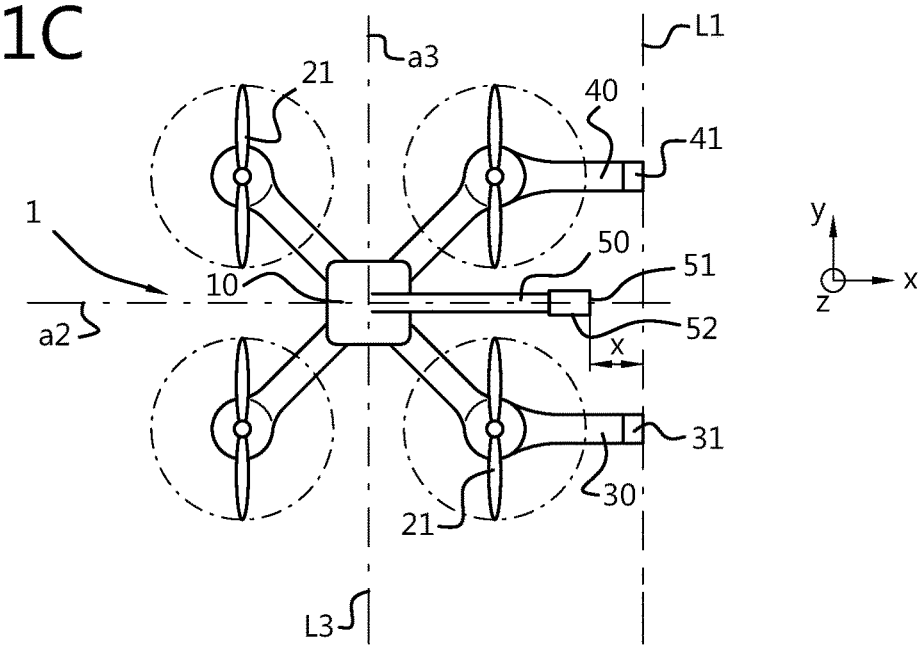

FIG. 1A shows a side view of a UAV 1, a quadcopter, having a body 10 with four rotors 21. The rotors 21 define a first plane RP, with an upper side 3 and a lower side 4. A first leg 30 and second leg 40 (see FIG. 1C) are attached to the body 10, extending into a frontal direction X, at the lower side 4 of the first plane RP, and comprising first and second leg ends 31, 41. From the side view of FIG. 1A only one of the legs is visible, though both legs are shown in FIGS. 1B and 1C. An arm 50 is attached to the body 10 and extends in the frontal direction X and in the vertical direction Z. The arm comprises an arm end 51 and an inspection or manipulation device 52. The arm end 51 and the leg ends 31, 41 together define a front plane FP which intersects said ends 31,41,51. As the leg ends 31, 41 are, in projection onto the first plane RP, located further from the body 10 in the frontal direction X than the arm end 51, the front plane FP is tilted with respect to the first plane RP, defining an angle α. The arm end 51 and leg ends 31, 41 can be placed against a wall such that the front plane FP coincides with the wall. The body 10 comprises equipment needed for the UAV 1 to be operable, including communication equipment and power supply. Additionally, the body 10 may comprise a camera, lighting equipment, protective cover, landing gear, and so on, and so forth.

FIG. 1B shows a front view of the UAV of FIG. 1A, in which a first line L1 through the leg ends 31, 41 and a second line L2 parallel to the first line L1 and through the arm end 51 has been indicated. A vertical axis a1 defines the yaw of the drone.

FIG. 1C shows a top view of the same UAV. In projection onto the first plane RP, the arm end 51 is located at an arm distance x from the first line L1. The attachment of the arm 50 to the body 10 defines a third line L3, parallel to the first line L1. In projection onto the first plane RP, the rotors 21 are entirely located between the first line L1 and the third line L3, including the area defined by their rotation in the first plane RP. A longitudinal axis a2 defines the roll of the drone, while a lateral axis a3 defines the pitch of the drone.

Figure 2A:
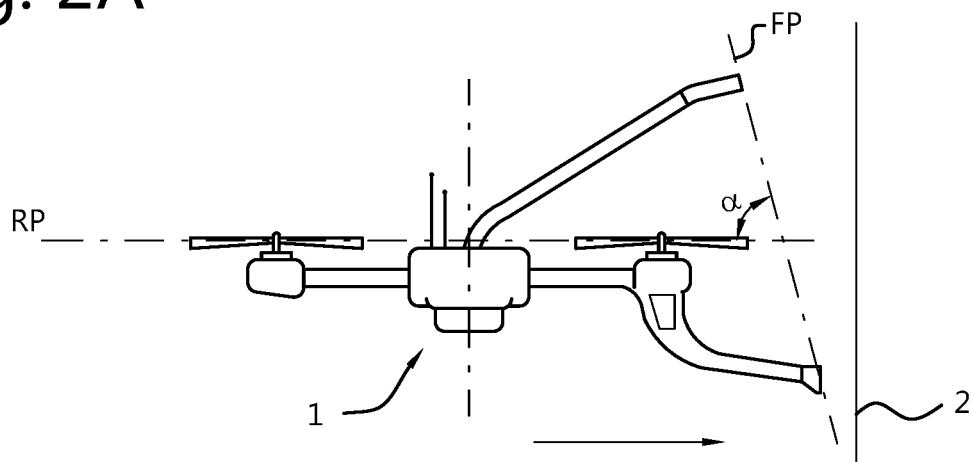
FIGS. 2A-2C schematically depict a method of stably positioning a drone against a wall according to the invention.
Figure 2B:
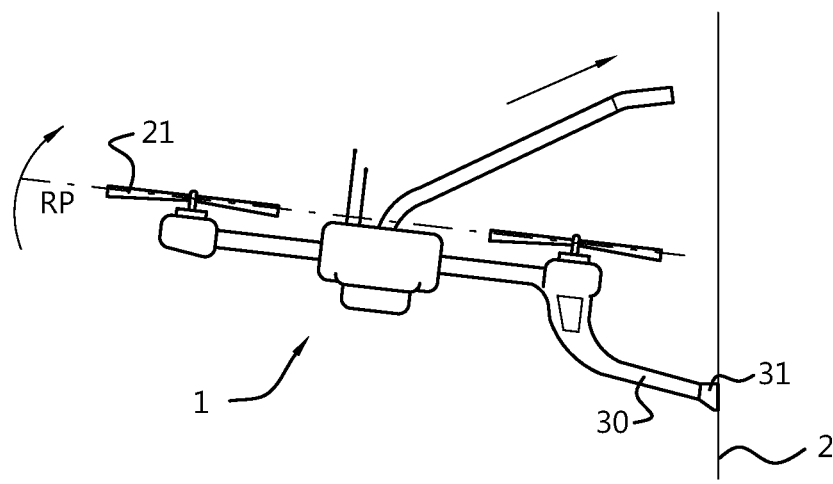
Figure 2C:
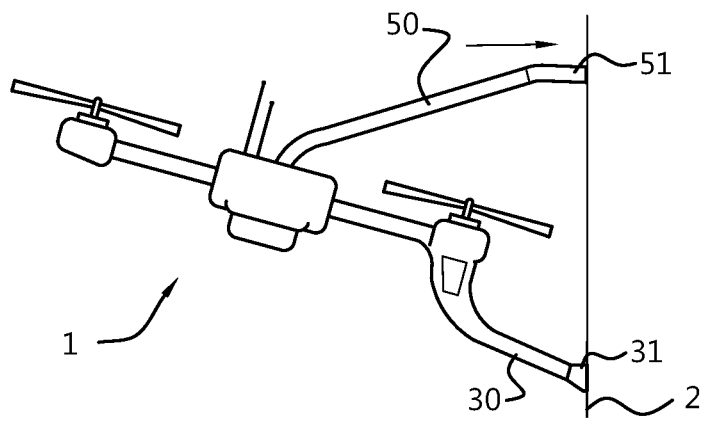

FIGS. 2A-2C illustrate steps for positioning the UAV 1 against a vertical wall 2. FIG. 2A shows the UAV 1 approaching the wall 2 while the first plane RP is substantially horizontal. FIG. 2B shows the UAV 1 when the leg end 31 of the first leg 30, and also the second leg end, though not shown, touches the wall 2. As a result of the upwards oriented propulsion force of the rotors 21, the UAV 1 starts tilting around the horizontal line defined by the leg ends 31, 41.

FIG. 2C shows the UAV 1 after tilting, when also the arm end 51 of the arm 50 touches the wall 2, establishing a stable three point connection between the UAV 1 and the wall 2, and the arm end 51 exerts a substantially horizontal force against the wall 2.

Figure 3A:
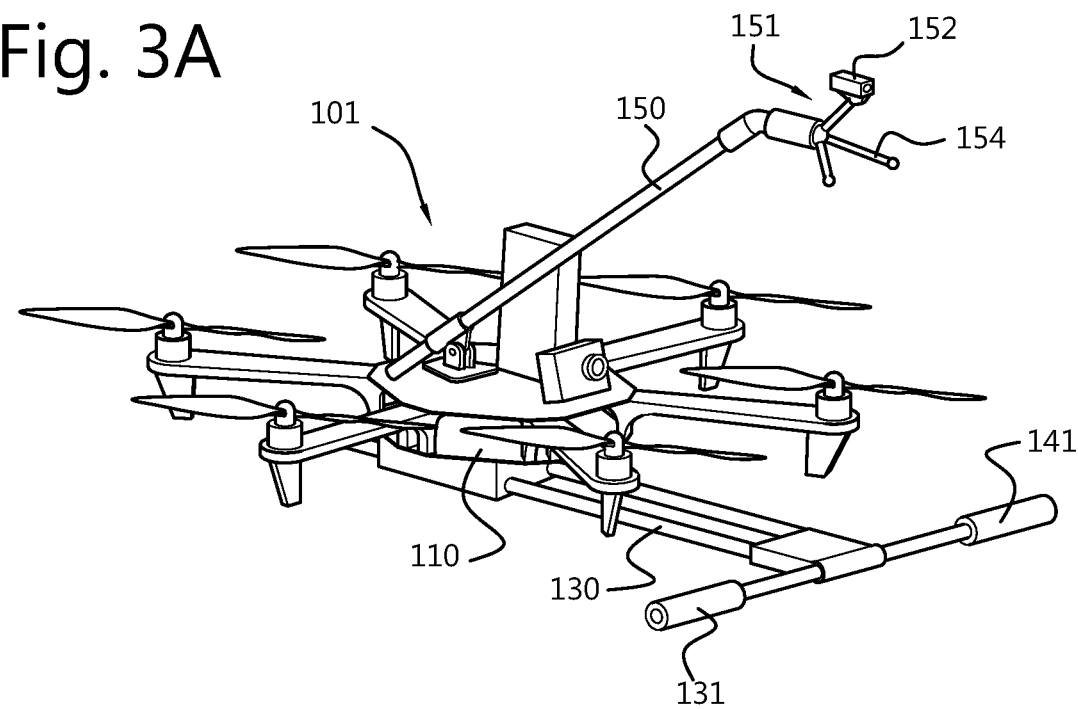
FIG. 3A schematically shows a perspective view of a UAV according to the invention.
Figure 3B:
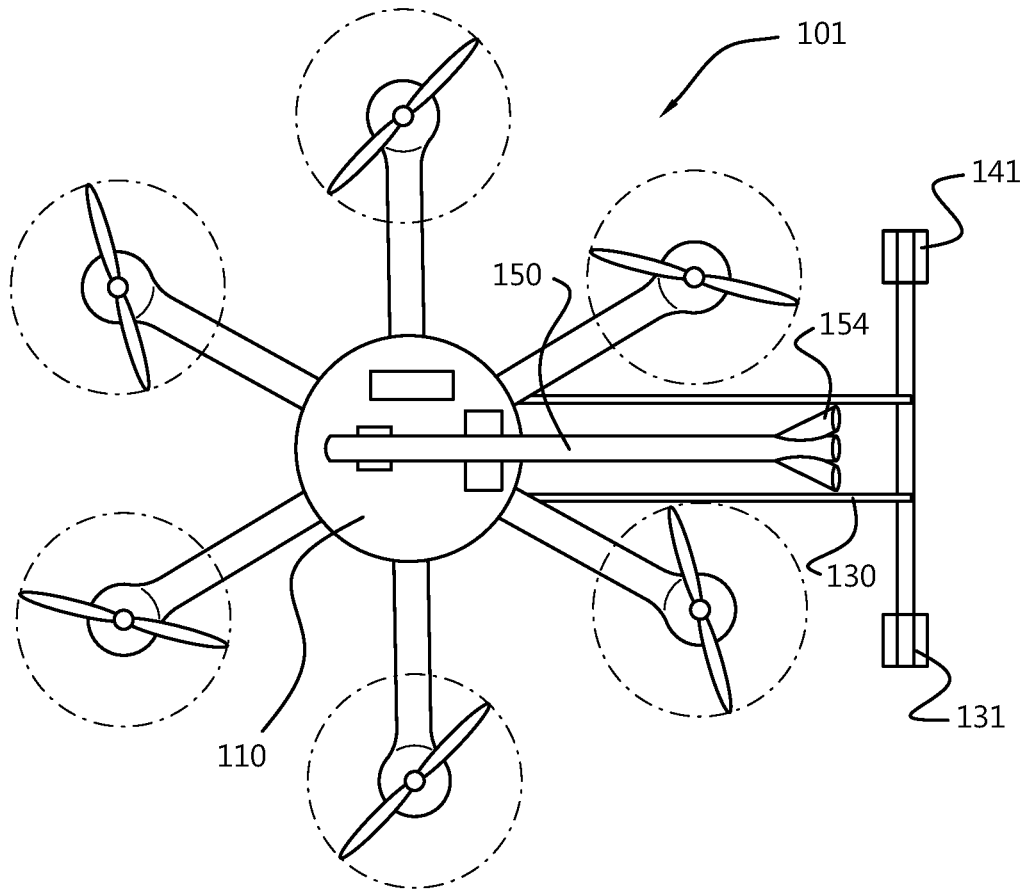
FIG. 3B schematically shows a top view of the UAV of FIG. 3A.

FIGS. 3A and 3B respectively show a UAV 101, a hexacopter, in perspective view and top view. The UAV 101 comprises a first leg 130, which are attached to the body 110. The two leg ends 131, 141 extend sideways from the first leg 130. The arm 150 is attached to the body 110. The arm end 151 is formed by a tripod 154, which is adapted to contact a wall (not shown) upon rotation around the leg ends 131, 141. The tripod 154 is rotatable with respect to the body 110.

Figure 4A:
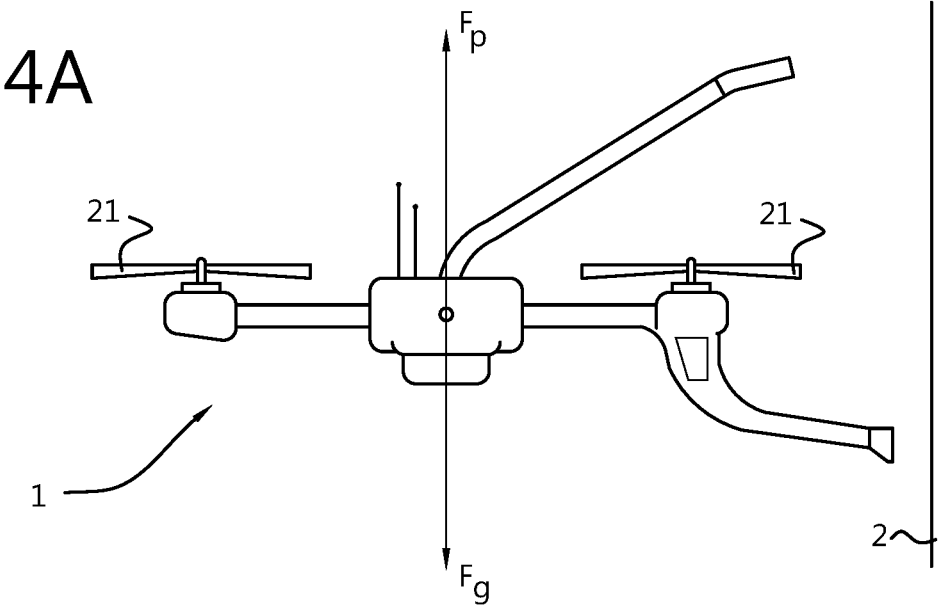
FIGS. 4A-4B schematically show the relevant forces for a horizontal and tilted UAV according to the invention.

FIG. 4A shows the UAV 1 of FIG. 1A, further showing the force of gravity $F_g$ acting on the UAV and a total propulsion force $F_p$ delivered by the rotors 21. The forces are oppositely directed and of equal magnitude when the UAV 1 hovers without changing its height position and without contacting the wall 2.

Figure 4B:
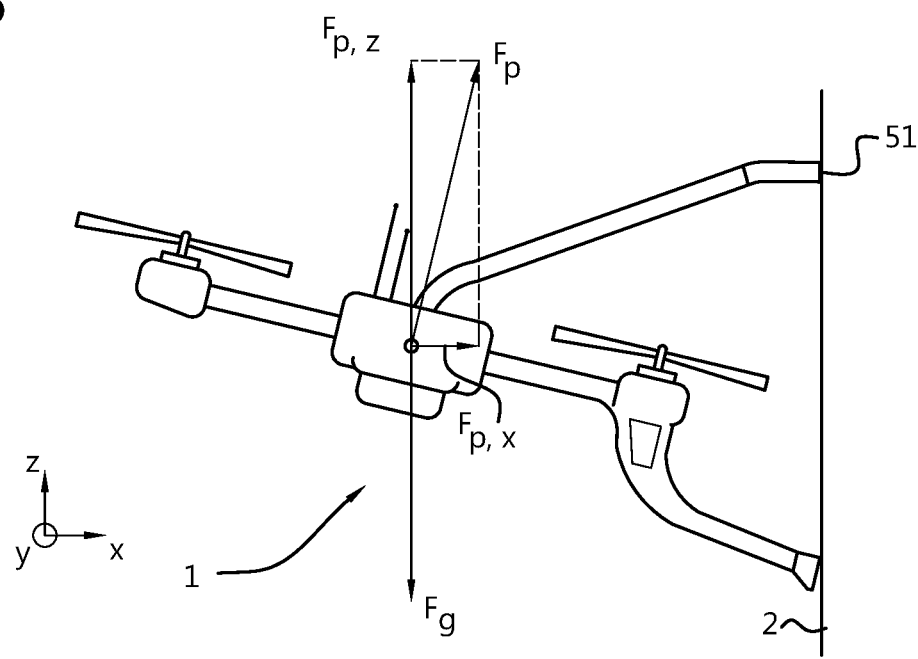

FIG. 4B shows the UAV 1 of FIG. 4A, but now tilted such as described above. The gravity force $F_g$ is still the same in the downward vertical direction, but the total propulsion force $F_p$ can be composed of a component in the vertical upward direction Z, $F_{p,z}$, counteracting the gravity force $F_g$, and a component in the frontal direction X, $F_{g,x}$, which can be used to press the arm end 51 against the vertical wall 2.

Figure 5:
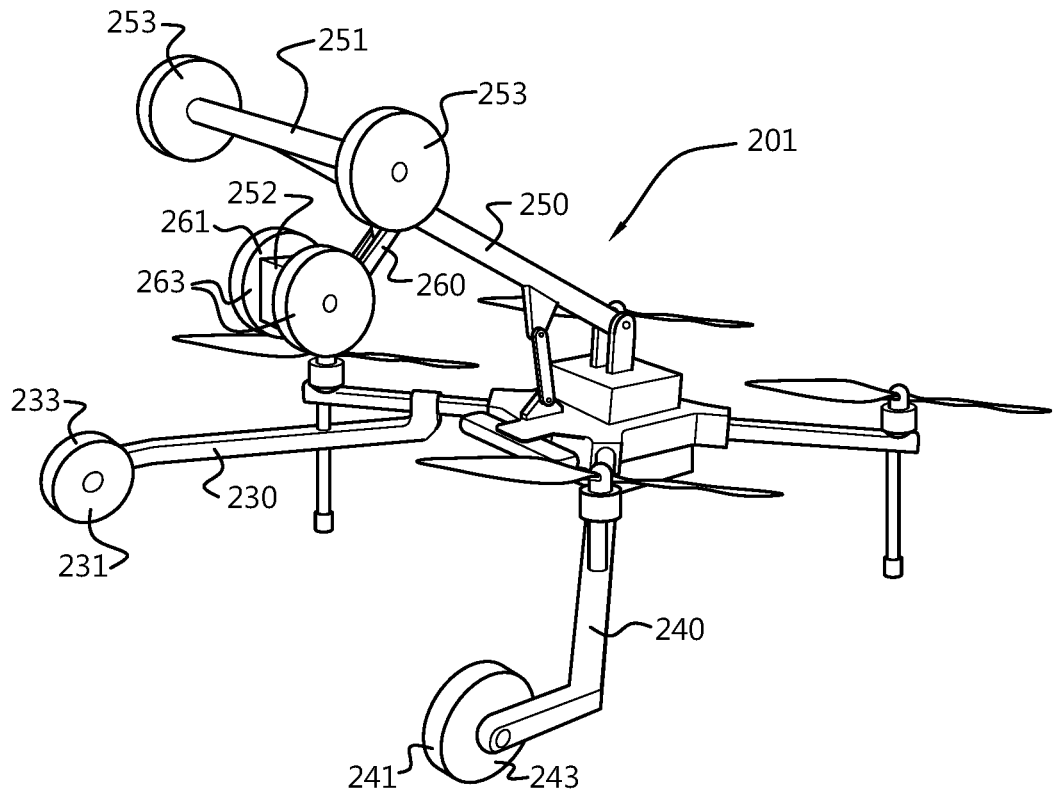
FIG. 5 schematically shows a perspective view of a UAV according to an embodiment.

FIG. 5 shows a UAV 201, of which the leg ends 231 and 241 and the arm end 251 comprise vertically oriented wheels 233, 243, 253. A side leg 260 is resiliently and rotatably attached to the arm 250. The side leg end 261 comprises an inspection device 252 which is positioned between wheels 263. When approaching a substantially vertical wall, the UAV 201 will touch the wall firstly with the wheels 233, 243 attached to the legs 230, 240. Subsequently, the wheels 263 of the side leg 260 will touch the wall and stay pressed against the wall when the UAV 201 tilts. When the wheels 253 of the arm 250 touch the wall too, the UAV 201 has assumed a stable position against the wall. The inspection device 252 maintains a constant distance from the wall, while the UAV 201 may move substantially parallel to the wall when the wheels 233, 243, 253, 263 maintain in contact with the wall. Because of the resilient attachment of the side leg 260, the wheel 263 of the side leg end 261 will stay in contact with the wall, even when irregularities in the wall surface cause any of the other wheels 233, 243, 253 to temporarily lose contact with the wall when moving along the wall. The side leg 260 may be biased and urged against the wall, e.g. by means of a spring.

Figure 6:
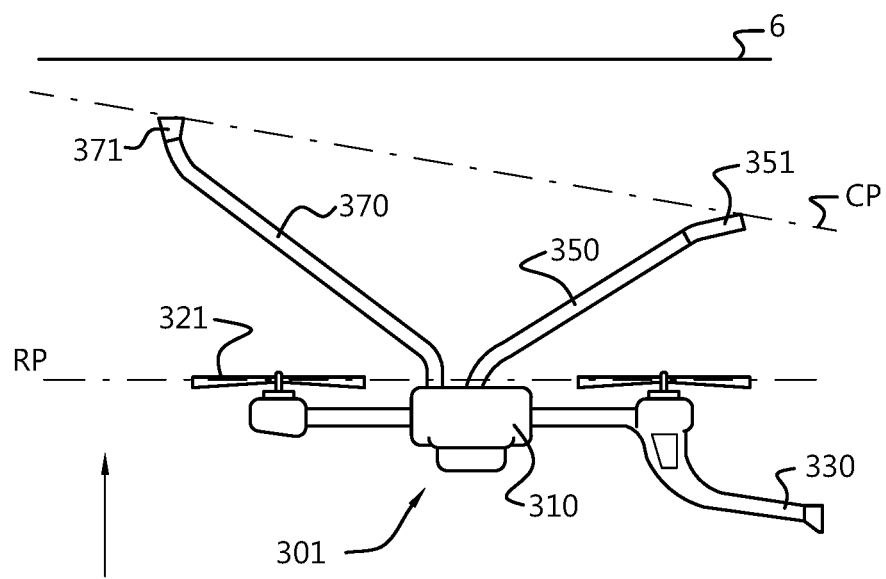
FIG. 6 schematically shows a side view of a UAV according to an embodiment.

FIG. 6 shows a UAV 301 with an arm 350 with an arm end 351 at a distal end of the arm 350, away from the body 310, and legs 330 which further comprises mechanisms for contacting a substantially horizontal ceiling 6. To this end, the UAV 301 further comprises the UAV 301 comprises an upper leg 370, attached to the body 310 and comprising a third leg end 371 and a fourth leg end 372, wherein the third and fourth leg ends 371, 372 are arranged at distal ends of the one or more upper legs 370 away from the body 310. The fourth leg end 372 is not visible in FIG. 6 but is similar to the third leg end 371.

The arm end 351, third leg end 371 and fourth leg end 372 are adapted for together contacting the ceiling 6 at three spaced apart positions to position the UAV 301 against the ceiling. The body 310, the rotors 321 and the arm 350 and upper legs 370 are adapted to be tilted in conjunction upon contact of the third and fourth leg ends 371, 372 with the horizontal ceiling 6 while the third and fourth leg ends 371, 372 are arranged along a substantially horizontal line and the arm end 351 is spaced apart from the ceiling 6, about the third and fourth leg ends 371, 372 over a further angle of between 5 to 45 degrees towards the ceiling, until the arm end 351 contacts the horizontal ceiling 6 and the ceiling plane CP, intersecting the arm end 351 and third and fourth leg ends 371, 372, is substantially parallel to the ceiling 6.

In summary, the invention provides an unmanned aerial vehicle adapted to be positioned against a substantially vertical wall while hovering in the air, comprising a body and rotors, an arm end, a first leg end and a second leg end intersected by a front plane and adapted for together contacting the wall at three spaced apart positions, said front plane intersecting a vertical axis of the UAV at an upper side of a first plane spanned by a lateral and longitudinal axis of the UAV, the front plane extending at a first angle (a) of between 45 to 85 degrees to the first plane; wherein the UAV is adapted for tilting upon contact of the first and second leg ends with the substantially vertical wall while the first and second leg ends are arranged along a substantially horizontal line and while the arm end approaches the wall, about the first and second leg ends and towards the wall, until the arm end contacts the substantially vertical wall.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. It will be apparent to the person skilled in the art that alternative and equivalent embodiments of the invention can be conceived and reduced to practice. All changes which come within the meaning and range of equivalency of the claims are to be embraced within their scope.

The invention claimed is:

1. An unmanned aerial vehicle (UAV) adapted to be positioned against a substantially vertical wall while hovering in the air, the vehicle defining a longitudinal axis, a lateral axis and a vertical axis, the longitudinal axis and the lateral axis together spanning a first plane having an upper side and an oppositely facing lower side, the vehicle comprising:
   a body and a number of rotors supported by said body, the rotors adapted for exerting a propulsion force on the vehicle in an upward substantially vertical direction;
   an arm attached to the body and comprising an arm end arranged at a distal end of the arm away from the body; and
   one or more legs fixed against rotation and attached to the body, the one or more legs comprising a first leg end and a second leg end, the leg ends arranged at distal ends of the one or more legs away from the body and below the arm end when the rotors exert the propulsion force on the vehicle in the upward substantially vertical direction,
   wherein the arm end, the first leg end and the second leg end are intersected by a front plane and are adapted for contacting the wall together at three spaced apart positions, said front plane intersecting the vertical axis at the upper side of the first plane and extending at a first angle of between 45 to 85 degrees to the first plane, and
   wherein the body, the rotors, the arm end and leg ends are adapted to tilt in conjunction, upon contact of the first and second leg ends with the substantially vertical wall while the first and second leg ends are arranged along a substantially horizontal line and while the arm end approaches the wall, about the first and second leg ends and towards the wall, until the arm end contacts the substantially vertical wall.

2. The unmanned aerial vehicle according to claim 1, wherein the leg ends intersect a second plane normal to the first plane, and
   wherein, when viewed in projection onto the second plane, the rotors are arranged between a first line through the leg ends and a second line through the arm end and parallel to the first line, the rotors being spaced apart from both lines respectively by a distance equal to or greater than one fourth of the distance between the first and second line.

3. The unmanned aerial vehicle according to claim 1, wherein the leg ends are arranged for allowing axes of the rotors to remain in substantially parallel vertical planes during said tilting when the leg ends are in contact with the wall and arranged on the substantially horizontal line.

4. The unmanned aerial vehicle according to claim 1,
   wherein the vehicle has a centre of mass, and
   wherein, when viewed in projection onto the first plane, the arm is attached to the body at a location at or rearward of a line through the centre of mass and parallel to a first line through the leg ends.

5. The unmanned aerial vehicle according to claim 1, wherein the arm end and/or the leg ends comprise rotatable wheels for contacting the wall.

6. The unmanned aerial vehicle according to claim 1, the vehicle further comprising:
   one or more upper legs fixed against rotation and attached to the body and comprising a third leg end and a fourth leg end,
   wherein the third and fourth leg end are arranged at distal ends of the one or more upper legs away from the body at the upper side of the first plane,
   wherein the third and fourth leg end define a horizontal line parallel to the first plane, and
   wherein the third and fourth leg end extend further from the first plane than the arm end.

7. The unmanned aerial vehicle according to claim 1, further comprising:
   an inspection or manipulation device attached to the arm, wherein said inspection or manipulation device is adapted for measuring a wall property and/or for manipulating the wall.

8. The unmanned aerial vehicle according to claim 7, wherein said inspection or manipulation device is adapted for inspecting or manipulating the wall while making pressure contact with the wall.

9. The unmanned aerial vehicle according to claim 7, wherein the inspection or manipulation device is rotatably attached to the arm.

10. The unmanned aerial vehicle according to claim 7, wherein the arm end is formed by the inspection or manipulation device, said inspection or manipulation device arranged for contacting the wall upon tilt of the vehicle.

11. The unmanned aerial vehicle according to claim 7,
    wherein the inspection or manipulation device has a contact end for contacting the wall, and
    wherein said contact end, at least when the vehicle is in the tilted position in which the arm end and first and second leg ends contact the wall, is arranged partially in the front plane.

12. The unmanned aerial vehicle according to claim 1, wherein axes of the rotors extend substantially parallel to each other and are oriented normal to the first plane.

13. The unmanned aerial vehicle according to claim 12, wherein, when viewed in projection onto the first plane, the arm end is spaced apart by an arm distance from the second plane, the arm distance being greater than 5% of the maximum distance between two rotor axes.

14. The unmanned aerial vehicle according to claim 12, wherein the rotors are arranged substantially symmetrically around a symmetry axis which extends parallel to the vertical axis.

15. The unmanned aerial vehicle according to claim 12, wherein, when viewed in projection onto the first plane, at least one of the rotor axes is arranged between a first line through the leg ends and a third line through a point where the arm is connected to the body and parallel to the first line.

16. The unmanned aerial vehicle according to claim 15,
    wherein the rotors are arranged between a bottom plane parallel to the first plane and intersecting the leg ends and a top plane parallel to the first plane and intersecting the arm end, and
    wherein the rotors are spaced apart from both the top plane and the bottom plane respectively by a distance equal to or greater than one fourth of the distance between the top plane and the bottom plane.

17. A method for positioning an unmanned aerial vehicle (UAV) against a substantially vertical wall, the vehicle defining a longitudinal axis, a lateral axis and a vertical axis, the longitudinal axis and the lateral axis together spanning a first plane having an upper side and an oppositely facing lower side, the vehicle further comprising two leg ends and an arm end, wherein a front plane intersects the two leg ends and the arm end, said front plane intersecting the vertical axis at the upper side of the first plane and extending at a first angle of between 45 to 85 degrees to the first plane, the method comprising:
- manoeuvring the vehicle to the wall until the two leg ends contact the wall; and
- tilting the vehicle about the two leg ends which contact the wall, towards the wall until the arm end touches the wall.

18. A method for positioning an unmanned aerial vehicle (UAV) against a substantially vertical wall, the vehicle defining a longitudinal axis, a lateral axis and a vertical axis, the longitudinal axis and the lateral axis together spanning a first plane having an upper side and an oppositely facing lower side, the vehicle further comprising two leg ends and an arm end, wherein a front plane intersects the two leg ends and the arm end, said front plane intersecting the vertical axis at the upper side of the first plane and extending at a first angle of between 45 to 85 degrees to the first plane, the method comprising:
- manoeuvring the vehicle to the wall until the two leg ends contact the wall; and
- tilting the vehicle about the two leg ends which contact the wall, towards the wall until the arm end touches the wall,
- wherein the UAV is a UAV according to claim 1.

* * * * *